United States Patent
Santicchi (10) Patent No.: US 12,378,081 B2
(45) Date of Patent: Aug. 5, 2025

(54) APPARATUS FOR MOVING AND SORTING ARTICLES

(71) Applicant: IMMOBILIARE METALPROGETTI S.R.L., Perugia (IT)

(72) Inventor: Enrico Maria Santicchi, Perugia (IT)

(73) Assignee: IMMOBILIARE METALPROGETTI S.R.L., Perugia (IT)

( * ) Notice: Subject to any disclaimer, the term of this patent is extended or adjusted under 35 U.S.C. 154(b) by 124 days.

(21) Appl. No.: 17/999,438

(22) PCT Filed: May 20, 2021

(86) PCT No.: PCT/IT2021/050153
§ 371 (c)(1),
(2) Date: Nov. 21, 2022

(87) PCT Pub. No.: WO2021/234753
PCT Pub. Date: Nov. 25, 2021

(65) Prior Publication Data
US 2023/0202763 A1     Jun. 29, 2023

(30) Foreign Application Priority Data
May 21, 2020 (IT) .................... 102020000011812

(51) Int. Cl.
*B65G 19/02* (2006.01)
*B65G 9/00* (2006.01)
*B65G 47/48* (2006.01)

(52) U.S. Cl.
CPC .......... *B65G 19/025* (2013.01); *B65G 9/008* (2013.01); *B65G 47/48* (2013.01)

(58) Field of Classification Search
CPC ................. B65G 19/025; B65G 9/00
See application file for complete search history.

(56) References Cited

U.S. PATENT DOCUMENTS

| | | | | |
|---|---|---|---|---|
| 2,536,575 A | * | 1/1951 | Seldin | B65G 19/025 |
| | | | | 198/465.4 |
| 2,946,427 A | * | 7/1960 | Friedman | D06F 95/00 |
| | | | | 198/359 |
| 2,998,136 A | * | 8/1961 | Gerisch | B65G 19/025 |
| | | | | 198/465.4 |

(Continued)

FOREIGN PATENT DOCUMENTS

| | | |
|---|---|---|
| DE | 10 2010 053426 B3 | 6/2012 |
| JP | H06 45938 U | 6/1994 |
| JP | 2003 292124 A | 10/2003 |

*Primary Examiner* — William R Harp
(74) *Attorney, Agent, or Firm* — K&L Gates LLP (57) ABSTRACT

An apparatus for moving and sorting articles between a plurality of destination stations including at least one hooking member, configured to accommodate hanging, or hooking by a hanger, the articles to be sorted, and on which there are defined a plurality of hooking sectors which follow each other in succession on the hooking member, wherein each hooking sector is associated to a specific destination station to which the articles hanging in the hooking sector are sorted. The apparatus also comprises a plurality of markers, each associated with a respective hooking sector to visually communicate to an operator the destination station associated with that hooking sector and a sorting device to sort the articles towards their specific destination station.

17 Claims, 3 Drawing Sheets

(56) References Cited

U.S. PATENT DOCUMENTS

| | | | |
|---|---|---|---|
| 4,991,719 A * | 2/1991 | Butcher | ................... G06F 7/08 |
| | | | 198/465.4 |
| 2005/0121292 A1 | 6/2005 | Braunmuller | |
| 2018/0012524 A1 | 1/2018 | Jalali | |
| 2020/0079594 A1 | 3/2020 | Sieksmeier | |

* cited by examiner

APPARATUS FOR MOVING AND SORTING ARTICLES

FIELD OF THE INVENTION

Embodiments described here concern an apparatus for moving articles and sorting them, more particularly an apparatus for moving and sorting articles of clothing in laundries or warehouses or similar premises.

BACKGROUND OF THE INVENTION

Apparatuses for moving and sorting articles, such as for example articles of clothing, between different destination stations suitable for use in industrial laundries, warehouses and other similar premises are known and have been made available.

The apparatuses for moving articles known in the state of the art are generally provided with a hooking member on which the articles to be moved are hooked, or hung, by means of suitable hooking means, such as for example hangers.

In known apparatuses, the hooking member can be configured as a chain, or as a strip, or belt provided with portions suitable to receive the hooking means.

In known forms, the hooking member is connected to a movement member which, by means of a transmission, moves it.

It is also known that the article is hooked together with a label or, in general, with a recognition mean associated with it.

In fact, it is provided to associate each hooked article, or garment, with a recognition mean that identifies it and specifies, at least, its destination from among the different destination stations that can be reached by the apparatus.

Known movement apparatuses provide that this label, or recognition mean, carries a code, which can be a barcode, or a QRcode, or even a radio frequency code (RFID) or magnetic code, or suchlike and similar.

The label, or recognition mean, is therefore suitable to be recognized by means of sensors comprised in the apparatus.

The sensors can be optical sensors, or they can be configured as radio frequency sensors or magnetic sensors.

Once recognized, the hooked articles are intended for one or more sorting devices located in succession which, based on what is captured by the sensor, are moved or not moved to sort the article toward the destination encoded in the recognition mean.

The sorting device is moved by one or more motors, or actuators, which are commanded by an intelligent central unit connected to one or more sensors suitable to recognize the recognition mean associated with the article.

An example of such an apparatus is described in U.S. Pat. No. 5,238,116 A.

Another example of an apparatus known in the state of the art is described in the United States patent application published with the publication number US-A1-2020/079594, even if in this case the recognition of the recognition means associated with each hooking member is intended to evaluate the wear of the roller that allows the movement of the hooking member itself.

One disadvantage of known apparatuses is that, since they require a complex recognition system, which comprises at least an electronic sensor and an intelligent unit, they have high production costs, and therefore high sales costs.

Another disadvantage of known apparatuses is that the presence of the sensors and the intelligent central unit, compromising their cost, does not make them suitable and applicable for use on a small scale, thus making the known solutions inflexible and limited in applications.

Another disadvantage is that each article, or garment, requires a specific and uniquely associated recognition mean that must be previously prepared and applied to the article to be moved.

This disadvantage makes it necessary to have an additional step of affixing the recognition mean to all the articles, thus negatively affecting the productivity of the process.

Another disadvantage is that known apparatuses require, during the installation step, a dedicated calibration of the sensors and recognition means and, during their useful life, ordinary and extraordinary maintenance of these sensors, with consequent impacts on the operating costs of the apparatus.

A first purpose of the invention is therefore to provide a member for moving and sorting articles which is less expensive to produce than known ones.

Another purpose of the present invention is to provide a member for moving and sorting articles which is simpler in its construction and more flexible in its applications.

Another purpose of the present invention is to provide an apparatus for moving and sorting articles which is simple for operators to use.

The Applicant has devised, tested and embodied the present invention to overcome the shortcomings of the state of the art and to obtain these and other purposes and advantages.

SUMMARY OF THE INVENTION

The present invention is set forth and characterized in the independent claims. The dependent claims describe other characteristics of the present invention or variants to the main inventive idea.

In accordance with the above purposes, the present invention provides an apparatus for moving and sorting articles between different destination stations.

The apparatus is provided with a hooking member. In particular, the articles to be moved and sorted are hooked, or hung, onto the hooking member by means of suitable hooking means.

In known apparatuses, the hooking member can be configured as a guide, or a profile, possibly discontinuous in its longitudinal development.

According to some embodiments, one or more hooking sectors are defined on the hooking member, which follow each other in succession thereon.

In some embodiments, a destination station is associated with each hooking sector, so that the articles hanging in one specific hooking sector are sorted in a specific destination station associated with the respective hooking sector.

The articles hanging on the hooking member are moved by the movement member.

In known forms, the movement member comprises a motor which, by means of a transmission, moves the articles hanging, or hooked, on the hooking member.

The apparatus also comprises one or more sorting devices, configured to selectively and autonomously assume a multiplicity of operating conditions in a manner that is repetitive and coordinated with the succession of the hooking sectors on the hooking member.

According to one aspect of the present invention, the apparatus also comprises one or more marker elements, or markers for short, each one associated with a respective hooking sector.

In some embodiments, these markers are configured to communicate visually to the operators, with simplicity and immediacy, which is the destination station associated with the hooking sector to which they refer.

Advantageously, by knowing in advance the destination of an article, an operator can position it very easily in the hooking sector associated with that destination, by virtue of the fact that the hooking sector is associated with a marker that communicates to the operator the destination station associated with that hooking sector.

In this way, the apparatus does not require complex and expensive sensors or recognition means.

According to one embodiment, the movement member comprises transporter elements.

The transporter elements define a hooking sector between the projection on the hooking member of one transporter element and that of another adjacent transporter element.

According to some embodiments, the movement member comprises a guide configured to allow a chain to slide inside it, moved by a motor.

In some embodiments, the transporter elements are disposed integral with, or rigidly connected to, the movement member.

According to some embodiments, the markers are disposed integral with, or rigidly connected to, the chain comprised in the movement apparatus.

The markers are positioned on the movement member in a manner that is repetitive and coordinated with the repetitive succession of the hooking sectors associated with the destination stations.

According to other embodiments, these markers are comprised between the two adjacent transporter elements that define the hooking sector with which said markers are associated.

In some embodiments, the markers can be configured as elements integral with the movement member, on which there is applied an identification of the associated destination station which can be configured as a number and/or a color and/or a name and/or an alphanumeric code and/or a combination of optical elements, such as bulbs, LEDs or similar and comparable elements.

With the expressions "integral" and "rigidly connected", here and hereafter in the present description it is to be understood that the elements to which these expressions refer, for example, in this specific case, the marker elements, are connected or attached to the movement member so that there is no relative movement between them, and therefore they move together.

According to one embodiment, the hooking member can be discontinuous in its longitudinal development. In particular, it can comprise at least two detached ends so as to form an interruption.

According to some embodiments, in the proximity of the interruption, the apparatus can comprise a sorting device comprising at least one conveyor element configured to cooperate with the hooking member and at least with an additional track.

The additional track can be configured to receive the articles from the sorting device and to transport them, that is, make them slide, to a predefined destination.

The conveyor element of the sorting device can alternatively assume an operating condition able to allow the sliding of the hooking mean from the hooking member to the additional track, or another operating condition able to allow the sliding of the hooking mean along the hooking member.

In other embodiments, the apparatus also comprises a control and command unit configured to know information relating to the distribution, sequence and position of the hooking sectors with respect to the hooking member.

Furthermore, the control and command unit is configured to command the motor and the sorting devices in a correlated manner, on the basis of the information as above, in order to selectively take them into their operating condition aligned with a track the moment in which one hooking sector presents itself in the proximity of the track that leads to the destination station associated with such hooking sector, and indicated by the marker associated with it.

BRIEF DESCRIPTION OF THE DRAWINGS

These and other aspects, characteristics and advantages of the present invention will become apparent from the following description of some embodiments, given as a non-restrictive example with reference to the attached drawings wherein.

DETAILED DESCRIPTION OF SOME EMBODIMENTS

We will now refer in detail to the possible embodiments of the invention, of which one or more examples are shown in the attached drawings. Each example is supplied by way of illustration of the invention and shall not be understood as a limitation thereof.

Before describing these embodiments, we must also clarify that the present description is not limited in its application to details of the construction and disposition of the components as described in the following description using the attached drawings. The present description can provide other embodiments and can be obtained or executed in various other ways. We must also clarify that the phraseology and terminology used here is for the purposes of description only, and cannot be considered as limitative.

Figure 5:
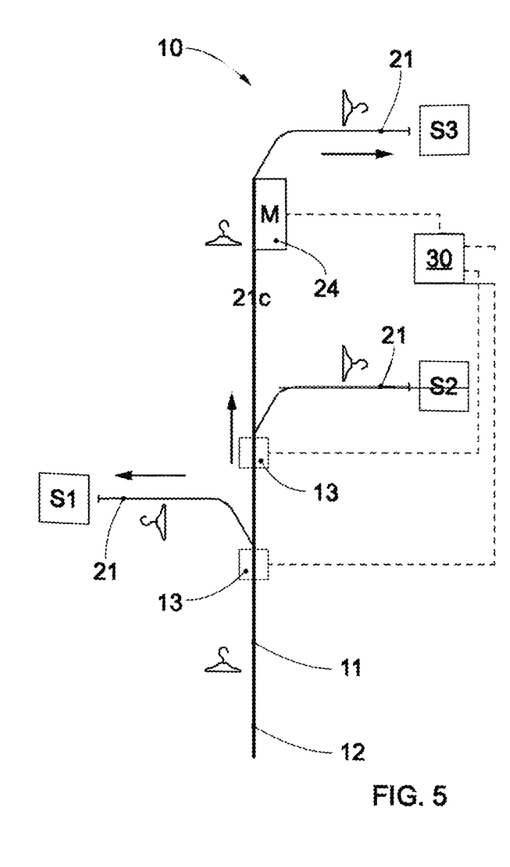
FIGS. 5 and 6 schematically show top plan views of two examples of possible layouts of the apparatus for moving and sorting articles according to the present invention.
Figure 6:
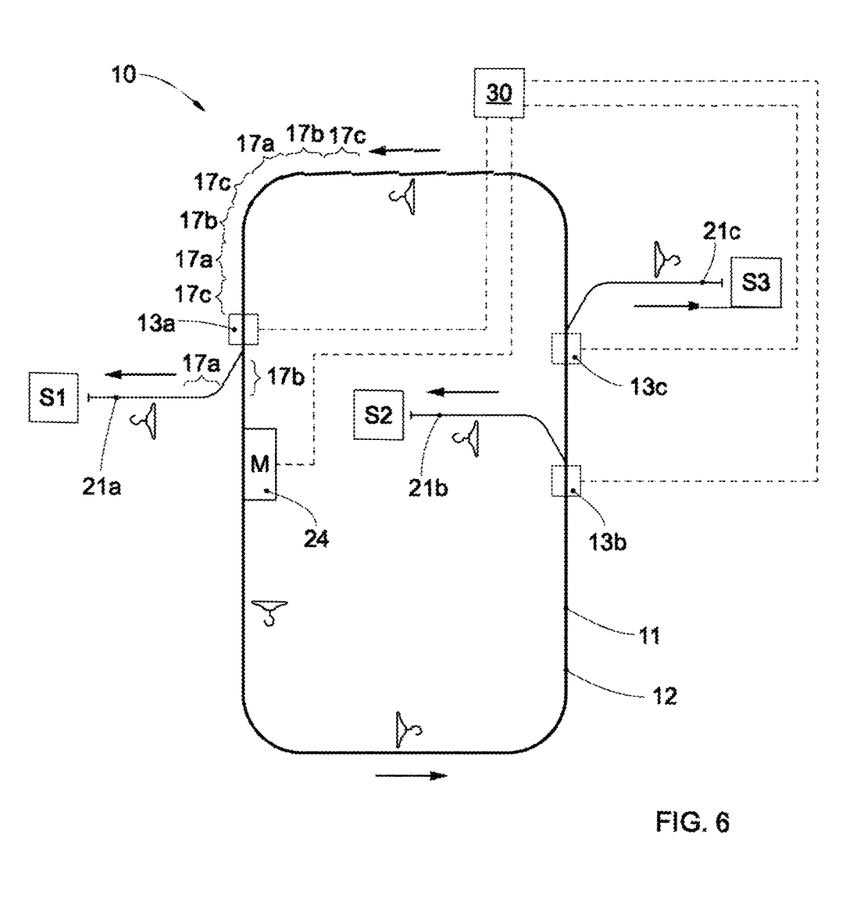

The attached drawings are used to describe embodiments of an apparatus 10 for moving and sorting articles between different destination stations, schematically indicated with S1, S2, S3 in FIGS. 5 and 6.

In these destination stations, there can be carried out respective working on items of clothing typical of an industrial laundry, such as for example a station in which the collar of a garment is ironed, or one where the cuffs of a suit are ironed and finished, or other.

Figures 1, 2:
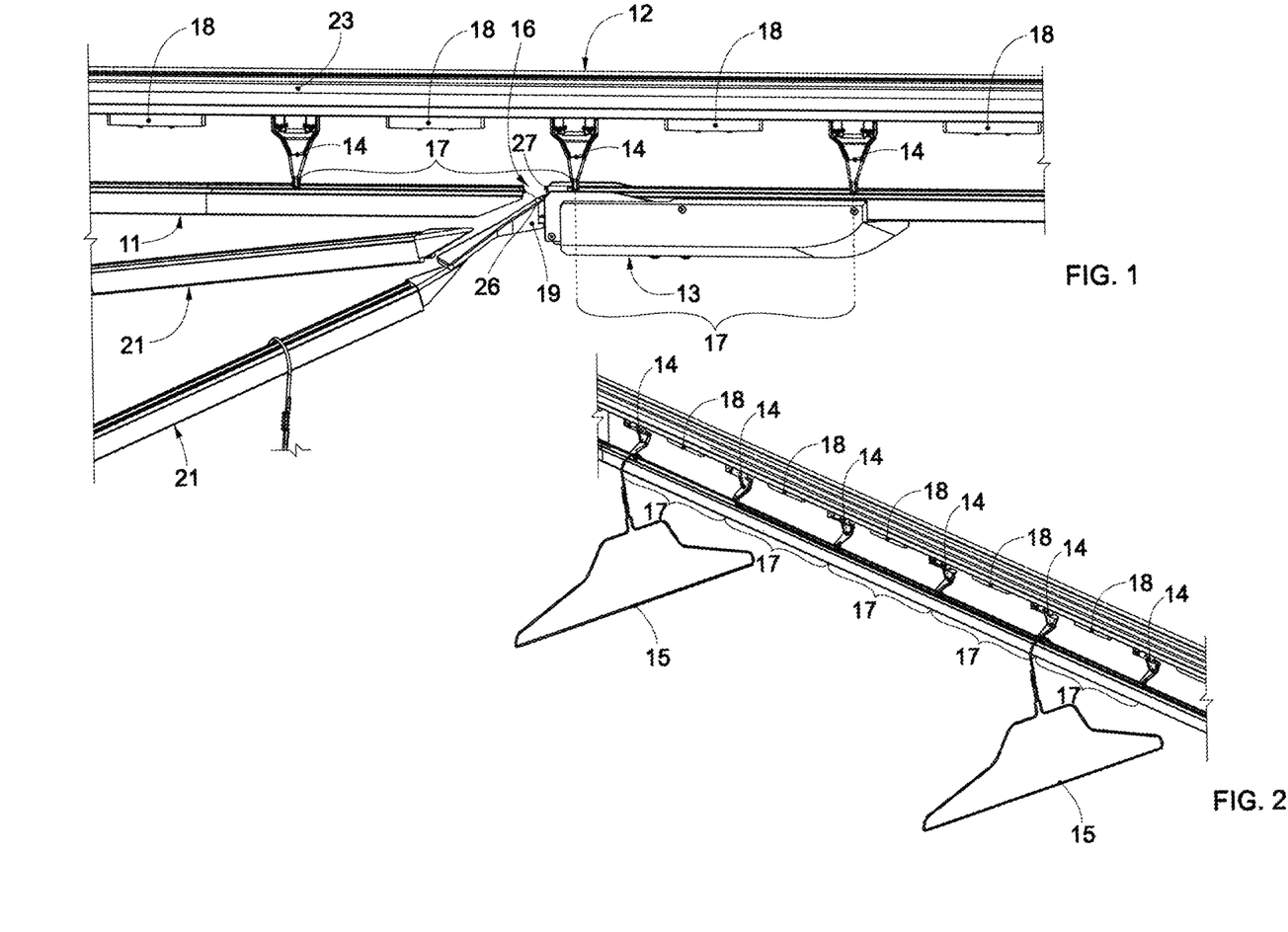
FIG. 1 is a three-dimensional view of a portion of the apparatus for moving and sorting articles according to one embodiment of the present invention.
FIG. 2 is a three-dimensional, front and enlarged view of a detail of the apparatus for moving and sorting articles according to one embodiment of the present invention.

According to one embodiment, shown in FIG. 1, the apparatus 10 comprises at least: a hooking member 11, a movement member 12, one or more sorting devices 13 and one or more additional tracks 21.

The apparatus 10 is configured to move articles hooked, or hung, by means of hooking means 15, to the hooking member 11, by means of the movement member 12, and to sort them toward respective additional tracks 21 by means of the sorting device 13.

The hooking member 11 is suitable to accommodate articles and make them slide, the articles being hooked to it by means of suitable hooking means 15.

According to one embodiment, the hooking means 15 can be configured as hangers, clothes hangers or crutches for hanging clothes thereon.

According to some embodiments, the hooking member 11 can be configured as a guide, or a track, able to support the hooking means 15.

In particular, in some embodiments, the hooking member 11 can be configured as a section bar, that is, a metal extrusion with a constant cross-section along its longitudinal development, on which the articles to be moved and sorted can be hung, or hooked.

In some embodiments, the longitudinal development of the hooking member 11 can be straight in some segments, curvilinear in some segments and/or a combination thereof.

According to one embodiment shown in FIG. 5, the longitudinal development of the hooking member 11 can define an open shape.

According to another embodiment shown in FIG. 6, the longitudinal development of the hooking member 11 can define a closed shape, for example a ring shape.

According to one embodiment, shown in FIG. 1, the hooking member 11 can be discontinuous.

In particular, along its longitudinal development, the hooking member 11 can have one or more interruptions 16.

In one embodiment, one interruption 16 can be obtained, by way of a non-limiting example, by placing portions of the hooking member 11 in proximity to each other with the respective ends 26, 27 facing each other, coherently with the longitudinal development of the hooking member 11, and detached from each other by a few centimeters.

According to some embodiments, the movement member 12 is configured to move the articles hanging, or hooked, on the hooking member 11.

Figure 3:
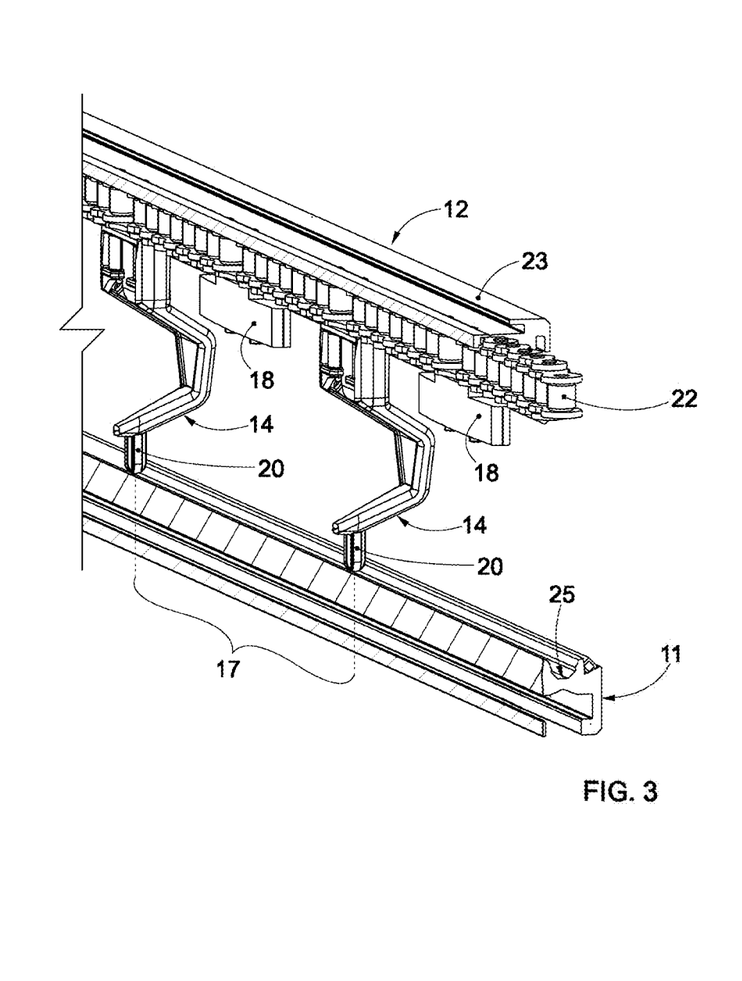
FIG. 3 is a three-dimensional, partly sectioned and enlarged view of a detail of the apparatus in FIG. 1.
Figure 4:
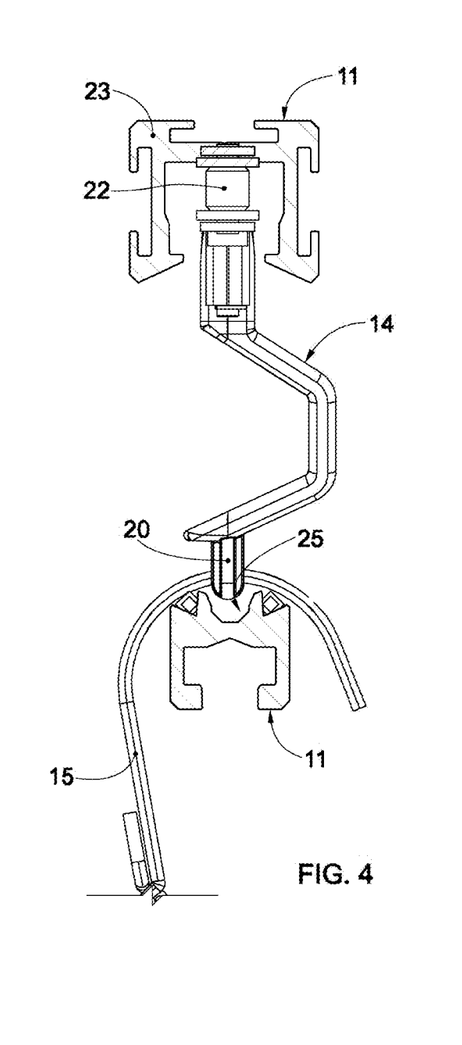
FIG. 4 is a front section view of the apparatus according to the present invention.

In one embodiment, shown in FIGS. 3 and 4, the movement member 12 can comprise: a guide 23, or track, a transmission 22, a motor 24 and a plurality of transporter elements 14.

In one embodiment, the guide 23 is configured to accommodate a chain 22.

According to some embodiments, a motor member 24, schematically indicated in FIGS. 5 and 6, is configured to engage and move the chain 22.

In some embodiments, the hooking member 11 and the movement member 12 are parallel, for example disposed one on top of the other.

In particular, in some preferred embodiments, the guide 23 can be parallel to the extruded element, which defines, in these embodiments, the hooking member 11.

In preferred embodiments, the transporter elements 14 can be integral with, or rigidly connected to, the chain 22.

In one embodiment, which can be seen in FIGS. 1, 2, 3 and 4, the transporter elements 14 develop vertically from the movement member 12 up to the hooking member 11 and are rigidly constrained to the movement members 12 in order to move together with them.

According to some embodiments, one of which can be seen in FIG. 2, a multiplicity of transporter elements 14 follow one another along the longitudinal development of the movement member 12.

In preferred embodiments, the transporter elements 14 are disposed in succession to each other and distanced, each one with respect to the following one or the previous one, according to a constant pitch.

According to some embodiments, a hooking sector 17 is defined between one transporter element 14 and another adjacent transporter element 14.

In particular, a hooking sector 17 can be defined by the portion of hooking member 11 which is comprised between two adjacent transporter elements 14 on the hooking member 11.

According to some embodiments, one of which can be seen in FIG. 2, a multiplicity of hooking sectors 17 follow each other along the hooking member 11.

Each hooking sector 17 is suitable to receive resting on it one or more articles by means of one or more hooking means 15.

Once the article has been hooked on the hooking member 11, in correspondence with a specific hooking sector 17, the article is led along the hooking member 11, moved by one of the transporter elements 14, which as mentioned is mobile together with the movement member 12.

In one embodiment, shown in FIG. 4, the hooking member 11 has a cavity 25 in its cross section and along its entire longitudinal development (FIGS. 3 and 4).

In some embodiments, the transporter elements 14 comprise a protuberance 20. This protuberance 20 is able to be inserted, at least partly, in the cavity 25.

Advantageously, in this way an operative connection of the transporter elements 14 to the hooking member 11 is made, thus delimiting the hooking sectors 17. It should be noted that this connection can provide that the transporter elements 14 contact the hooking member 11 for a sliding contact along the latter, or that they do not contact the hooking member 11. For example, in the embodiment shown in FIGS. 3 and 4, the transporter elements 14 do not contact the hooking member 11, but arrive in the proximity of the latter, brushing against it, so that the protuberance 20 manages to interfere with the hooking means 15 hanging on the hooking member 11, without directly contacting the cavity 25.

A destination station S1, S2, S3 is associated with each hooking sector 17. In particular, each article hung in a specific hooking sector 17 is sorted by the apparatus 10 in a specific destination station S1, S2, S3 associated with the hooking sector 17.

According to some embodiments, the apparatus 10 also has a sorting device 13.

This sorting device 13 is configured to selectively convey, that is, direct, the article, hooked onto the hooking member 11 by means of a hooking mean 15, toward a specific destination.

In some embodiments, the sorting device 13 can comprise a mobile conveyor element 19, configured to allow the sliding of a hooking mean 15 on it.

In particular, the conveyor element 19 can be hinged in one of the two ends 26, 27 of a portion of hooking member 11 which define one of the one or more interruptions 16.

According to some embodiments, the sorting device 13 can assume at least two operating conditions.

A first operating condition of the sorting device 13 can provide that the conveyor element 19 remains longitudinally aligned with the hooking member 11, according to the direction of longitudinal development thereof.

A second operating condition of the sorting device 13 can instead provide that the conveyor element 19 is aligned along its longitudinal direction with another additional track 21 comprised in the apparatus.

The additional tracks 21 are configured to receive the articles from the sorting device 13 and to transport them, or to make them slide, to a predefined destination station.

In some embodiments, the movement member 12 and the sorting device 13 are driven in a coordinated manner.

In some embodiments, the one or more sorting devices 13 move between the different operating conditions in a manner coordinated with the motion of the movement member 12 which moves the transporter elements 14 that define the hooking sectors 17.

More specifically, in some embodiments, the one or more sorting devices 13 are configured to autonomously assume the different operating conditions in a manner that is alternating, repetitive and coordinated with the succession of the hooking sectors 17 on the hooking member 11.

Advantageously, in this way, the apparatus does not require complex and expensive sensors or recognition means and intelligent systems for the coordination between sorting device and hooking sector.

According to some embodiments, each hooking sector 17 is associated with a marker 18.

In some embodiments, the marker 18 is comprised in the movement member 12.

In particular, according to one embodiment, which can be seen in FIGS. 3 and 4, the marker 18 can be integral with the chain 22 of the movement member 12.

According to some embodiments, the marker 18 is configured to encode and communicate to an operator of the apparatus which is the destination associated with the hooking sector 17 with which it is associated.

According to some embodiments, the marker 18 can be an element integral with the movement member 12, for example with the chain transmission 22. A label showing an identification of the destination station can be applied on the marker 18.

For example, this identification can be a number, or a color, or the name of the destination or an alphanumeric code associated with it.

In other embodiments, this indication can be supplied on a display comprised on the marker 18, or by means of a combination of optical elements such as, for example but not limited to, LED diodes or bulbs or similar and comparable elements.

According to one aspect of the invention, the marker 18 moves in the apparatus 10 integrally and in proximity to the hooking sector 17 with which it is associated.

In a preferred embodiment, the marker 18 is located between the two transporter elements 14 that delimit the hooking sector 17 with which the marker 18 is associated.

Advantageously, by knowing the destination of an article in advance, an operator can position it in the hooking sector 17 associated with that destination, by virtue of the fact that the hooking sector 17 can be associated with a marker 18 which communicates to the operator the destination station associated with that hooking sector.

In some preferred embodiments, the sequence with which the different hooking sectors 17 follow each other on the movement member 12 is repetitive.

According to some embodiments, the apparatus 10 also comprises a control and command unit 30 configured to know the distribution, sequence and position of the hooking sectors 17 with respect to the hooking member 11.

Furthermore, the control and command unit 30 can command the motor 24 and the sorting devices 13 in a correlated manner, in order to selectively take them into their operating condition aligned with an additional track 21 the moment in which one hooking sector 17 presents itself in the proximity of the additional track 21 that leads to the destination station associated with the hooking sector 17 and indicated by the marker 18 associated with it.

An example of the functioning of the apparatus 10 is described below with reference to FIG. 6.

In correspondence with an interruption 16, there is disposed a sorting device 13a configured to selectively lead the items of clothing toward a destination station S1 by means of an additional track 21a. Similarly, the sorting devices 13b and 13c are placed in correspondence with respective interruptions 16, the sorting devices 13b and 13c respectively being configured to selectively lead the items of clothing toward respective destination stations S2 and S3, by means of respective additional tracks 21b and 21c.

Continuing with the example, a set of hooking sectors 17a is associated with the destination station S1 reached by the additional track 21a, another set of hooking sectors 17b is associated with the destination station S2 reached by the additional track 21b and a set of hooking sectors 17c is associated with the destination station S3 reached by the additional track 21c.

An operator positions, by means of hooking means 15, the articles destined for the destination station S1 in a hooking sector 17a, the articles destined for the destination station S2 in a hooking sector 17b and the articles destined for the destination station S3 in a hooking sector 17c. Each hooking sector 17a, 17b, 17c is indicated by respective markers 18, configured to visually communicate to the operator that that specific hooking sector is associated with a specific destination station.

As one hooking sector 17a, 17b, 17c gradually reaches the sorting device 13a, 13b, 13c associated with the respective destination station S1, S2, S3, the device is disposed in the second operating condition as above, in which the conveyor element 19 is longitudinally aligned with the corresponding additional track 21a, 21b, 21c, so that the article or articles present in the specific hooking sector 17a, 17b, 17c leave the hooking member 11 in order to reach the corresponding destination station S1, S2, S3 continuing, for example by gravity, first along the conveyor element 19 of the sorting device 13a, 13b, 13c and then along the additional track 21a, 21b, 21c.

Evidently, when one hooking sector 17a, 17b, 17c arrives in correspondence with a sorting device that does not lead to the destination station correlated to this sector, the device is disposed in the first operating condition as above, in which the conveyor element 19 of the sorting device is longitudinally aligned with the hooking member 11 so that the article or articles present in the specific hooking sector 17a, 17b, 17c continue along the longitudinal development of the hooking member 11.

Specifically, with the passage of one hooking sector 17b, 17c the sorting device 13a will position itself so that the conveyor element 19 is again aligned with the hooking member 11, while with each passage of a hooking sector 17a, that is, the destination station of which is S1, the sorting device 13a takes the conveyor element 19 into alignment with the additional track 21a.

The same happens in relation to the functioning of the sorting devices 13b and 13c, in particular when the hooking sectors 17a-17c, and 17a-17b respectively arrive in correspondence with the devices.

The advantage of a repetitive succession of the hooking sectors 17 on the hooking member 11 is therefore evident, in this example 17a, 17b, 17c and again 17a and so on, which allows a synchronized and repetitive functioning of the sorting devices 13 and of the motor 24.

It is clear that modifications and/or additions of parts may be made to the apparatus 10 as described heretofore, without departing from the field and scope of the present invention, as defined by the claims.

It is also clear that, although the present invention has been described with reference to some specific examples, a person of skill in the art shall certainly be able to achieve many other equivalent forms of the apparatus, having the characteristics as set forth in the claims and hence all coming within the field of protection defined thereby.

The invention claimed is:

1. An apparatus for moving and sorting articles between a plurality of destination stations, comprising:
   (i) a hooking member configured to accommodate hanging, or hooking, the articles to be sorted, and on which there are defined a plurality of hooking sectors, which follow each other in succession on said hooking member, wherein one destination station comprised in said plurality of destination stations is associated with each hooking sector, so that the articles hanging in a specific hooking sector are sorted in a specific destination station associated with the respective hooking sector;
   (ii) a movement member, configured to move said hanging, or hooked, articles in said plurality of hooking sectors defined on said hooking member, wherein said movement member comprises a guide configured to allow sliding of a chain internal to said movement member, said chain moved by a motor; and
   (iii) a sorting device, configured to selectively and autonomously assume at least two operating configurations, wherein transition from a first operating configuration to a subsequent operating configuration is repeated and advances in coordination with the succession of the hooking sectors along the hooking member;
   wherein said apparatus comprises a plurality of markers, each associated with a respective hooking sector, configured to visually communicate to an operator the destination station associated with that hooking sector, and
   wherein said markers are disposed integral with, or rigidly connected to, the chain arranged in the movement member and wherein said markers are arranged between at least one transporter element which define the hooking sector with which said markers are associated.

2. The apparatus as recited in claim 1, wherein on the markers there is applied an identification of the associated destination station that comprises one or more of a number, a color, a name, an alphanumeric code, and/or a combination of optical elements, the optical elements comprising one or more of bulbs, LEDs or a combination thereof.

3. The apparatus as recited in claim 1, wherein said markers are repeated and correlate with a repeated succession of the hooking sectors associated with the destination stations.

4. The apparatus as recited in claim 1, wherein said hooking member comprises at least two ends detached so as to form an interruption along a longitudinal development, wherein the sorting device is disposed in proximity of said interruption comprising at least one transporter element configured to cooperate with the hooking member and with at least one track, wherein said transporter element is configured for being selectively positioned in a first operating condition allowing for sliding of the hooking mean along the hooking member, or in a second operating condition allowing for the sliding of the hooking mean from the hooking member up to track.

5. The apparatus as recited in claim 1, further comprising a control and command unit configured to command a motor for driving said movement member and said sorting devices on the basis of the distribution, sequence and position of said hooking sectors with respect to said hooking member, wherein said control and command unit is configured to know information relating to the distribution, sequence and position of the hooking sectors so as to command said motor and said sorting devices so that operation of said motor and said sorting devices is coordinated, in order to selectively take them into their operating condition aligned with a track the moment in which one hooking sector is in proximity of said track which leads to the destination station associated with said hooking sector and indicated by the marker associated with the hooking sector.

6. The apparatus as recited in claim 1, wherein said movement member comprises a plurality of transporter elements which follow one another along a longitudinal development of said movement member.

7. The apparatus as recited in claim 6, wherein said transporter elements are disposed integral with, or rigidly connected to, the movement member and wherein said transporter elements are distanced in succession from each other along said hooking member according to a constant pitch.

8. The apparatus as recited in claim 6, wherein each of said transporter elements comprises a protuberance able to be inserted, at least partly, into a cavity made in the cross-section of said hooking member, along the entire longitudinal development thereof.

9. The apparatus as recited in claim 6, wherein said transporter elements engage with said hooking member by means of a sliding contact along the hooking member, or the transporter elements do not engage with said hooking member, but the transporter elements arrive in proximity of the hooking member, brushing against the hooking member.

10. The apparatus as recited in claim 6, wherein on the markers there is applied an identification of the associated destination station that comprises one or more of a number, a color, a name, an alphanumeric code, and/or a combination of optical elements, the optical elements comprising one or more of bulbs, LEDs or a combination thereof.

11. The apparatus as recited in claim 6, wherein a hooking sector is defined between a projection on the hooking member of one transporter element and that of another adjacent transporter element.

12. The apparatus as recited in claim 11, wherein said transporter elements are disposed integral with, or rigidly connected to, the movement member and wherein said transporter elements are distanced in succession from each other according to a constant pitch.

13. The apparatus as recited in claim 11, wherein each of said transporter elements comprises a protuberance able to be inserted, at least partly, into a cavity made in the cross-section of said hooking member, along the entire longitudinal development thereof.

14. The apparatus as recited in claim 11, wherein said transporter elements engage with said hooking member by means of a sliding contact along the hooking member, or wherein said transporter elements do not contact said hooking member, but wherein said transporter elements arrive in proximity of the hooking member, brushing against the hooking member.

15. The apparatus as recited in claim 6, wherein transition from a first operating configuration to a subsequent operating configuration is repeated and advances in coordination with the repetitive succession of the hooking sectors associated with the destination stations.

16. The apparatus as recited in claim 6, wherein said hooking member comprises at least two ends detached so as to form an interruption along the longitudinal development, wherein a sorting device is disposed in proximity of said interruption comprising at least one transporter element configured to cooperate with the hooking member and with at least one track, and wherein said at least one transporter element is configured for being selectively positioned in a first operating condition, able to allow the sliding of the hooking mean along the hooking member, or in a second operating condition, able to allow the sliding of the hooking mean from the hooking member up to the track.

17. The apparatus as recited in claim 6, further comprising a control and command unit configured to command a motor for driving said movement member and said sorting devices on the basis of the distribution, sequence and position of said hooking sectors with respect to said hooking member, wherein said control and command unit is configured to know information relating to the distribution, sequence and position of the hooking sectors so as to command said motor and said sorting devices in a correlated manner, in order to selectively take them into their operating condition aligned with an additional track the moment in which one hooking sector is in proximity of said additional track which leads to the destination station associated with said hooking sector and indicated by the marker associated with the hooking sector.

\* \* \* \* \*